US006898270B2

(12) United States Patent
Lange et al.

(10) Patent No.: US 6,898,270 B2
(45) Date of Patent: May 24, 2005

(54) X-RAY OPTICAL SYSTEM WITH COLLIMATOR IN THE FOCUS OF AN X-RAY MIRROR

(75) Inventors: Joachim Lange, Hagenbach (DE); Detlef Bahr, Karlsruhe (DE); Kurt Erlacher, Graz (AT)

(73) Assignee: Bruker Axs GmbH, Karlsruhe (DE)

( * ) Notice: Subject to any disclaimer, the term of this patent is extended or adjusted under 35 U.S.C. 154(b) by 239 days.

(21) Appl. No.: 10/314,197

(22) Filed: Dec. 9, 2002

(65) Prior Publication Data

US 2003/0112923 A1 Jun. 19, 2003

(30) Foreign Application Priority Data

Dec. 18, 2001 (DE) ........................................ 101 62 093

(51) Int. Cl.[7] ........................... G21K 1/02; G21K 1/06; G21K 7/00; G01T 1/36; G01N 23/20

(52) U.S. Cl. .......................... 378/147; 378/82; 378/43; 378/71; 378/84

(58) Field of Search ........................... 378/84, 85, 147, 378/43, 71, 81, 82, 83, 44–50

(56) References Cited

U.S. PATENT DOCUMENTS 5,042,059 A * 8/1991 Watanabe et al. ........... 378/145
5,204,887 A * 4/1993 Hayashida et al. ........... 378/43
5,274,435 A * 12/1993 Hettrick ...................... 356/328
5,524,039 A 6/1996 Kamon
5,923,720 A * 7/1999 Barton et al. ................. 378/84

FOREIGN PATENT DOCUMENTS

WO WO 95/22 758 8/1995
WO WO 99/43 009 8/1999

OTHER PUBLICATIONS

"X–RAY MICROSCOPY", V.E. Cosslett et al., University Press, 1960, pp. 107–110.
"X–ray Microscope With Multilayer Mirrors", Underwood et al., Applied Optics 25, No. 11, 1986.

* cited by examiner

*Primary Examiner*—Craig E. Church
*Assistant Examiner*—Krystyna Suchecki
(74) *Attorney, Agent, or Firm*—Paul Vincent

(57) ABSTRACT

An X-ray optical system with an X-ray source (Q) and a first graded multi-layer mirror (A), wherein the extension $Q_x$ of the X-ray source (Q) in an x direction perpendicular to the connecting line in the z direction between the X-ray source (Q) and the first graded multi-layer mirror (A) is larger than the region of acceptance (F) of the mirror (A) at a focus ($O_a$) of the mirror (A) in the x direction, is characterized in that a first collimator (bl) is disposed at a focus of the first graded multi-layer mirror (A) between the X-ray source (Q) and the mirror (A) whose opening in the x direction corresponds to the region of acceptance of the first graded multi-layer mirror (A) and the separation $q_{zA}$ between first collimator (bl) and X-ray source (Q) is:

$$q_{zA}=Q_x/\tan\alpha_x,$$

wherein $\alpha_x$ is the angle subtended by the first graded multi-layer mirror (A) in the x direction, as viewed from the first collimator (bl). This permits reduction of the disturbing radiation on the sample for constant useful X-radiation power from the source Q.

21 Claims, 8 Drawing Sheets

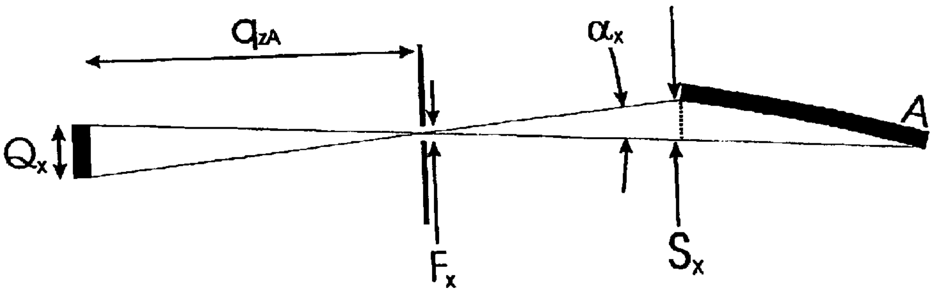
Fig. 3a
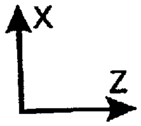
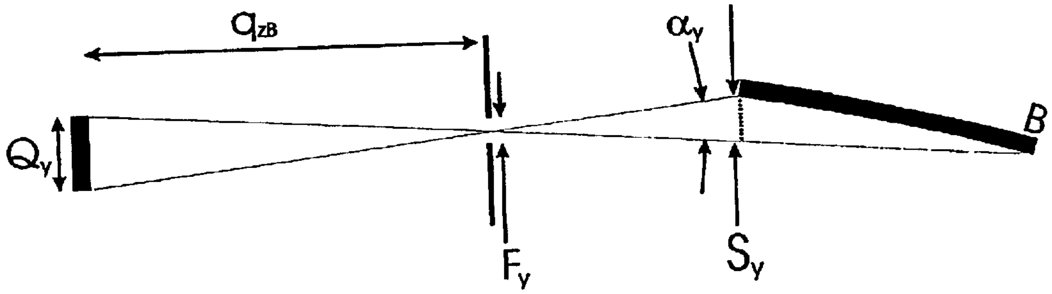
Fig. 3b
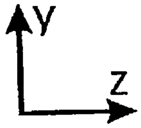

X-RAY OPTICAL SYSTEM WITH COLLIMATOR IN THE FOCUS OF AN X-RAY MIRROR

This application claims Paris Convention priority of DE 101 62 093.4 filed Dec. 18, 2001 the complete disclosure of which is hereby incorporated by reference.

BACKGROUND OF THE INVENTION

The invention concerns an X-ray optical system with an X-ray source and a first graded multi-layer mirror, wherein the extension $Q_x$ of the X-ray source in an x direction perpendicular to the connecting line in the z direction between X-ray source and a first graded multi-layer mirror is larger than the region of acceptance of the mirror at a focus of the mirror in the x direction.

A system of this type is known e.g. from "X-Ray Microscopy", V. E. Cosslett et al., Cambridge at the University Press, 1960 which describes the principal operating mode of an arrangement of this type.

A concave focusing X-ray mirror can have a cylindrical, elliptical, or parabolic surface of curvature. When parabolic mirrors are used, the impinging X-radiation can, in particular, be rendered parallel.

The use of multi-layer mirrors in connection with a Kirkpatrick-Baez arrangement is described in an article by J. Underwood in the journal, Applied Optics, Vol. 25, No. 11 (1986).

As background discussion of the magnitudes of the quantities of interest, it is noted that the angle of acceptance of typical multi-layer mirrors is in the region of 1 mrad and typical foci in the region of several centimeters. The electron focus of the X-ray source varies in a linear range of 10 $\mu$m to a few millimeters. The acceptance of one mirror has a minimum linear size in the region of a few 10 $\mu$m and is typically striped. However, typical X-ray samples have linear extensions in the range of 100 $\mu$m up to a few millimeters and typically several tenths of a millimeter.

One main problem with X-ray optical systems of this type having extended X-ray sources, is that only X-ray radiation from a relatively small surface region of the electron focus satisfies the Bragg condition for diffraction on the graded multi-layer mirror (=Göbel mirror). For this reason, only a small part of the useful emitted radiation is guided from the X-ray source via the X-ray mirror in a predetermined desired direction. The entire surface of the X-ray source emits disturbing radiation (with a "wrong" wavelength, in particular $K_\beta$) which can pass, via the X-ray mirror, through the entire apparatus to finally gain entrance to the X-ray detector.

In view of the above, it is the object of the invention to present an X-ray optical system with the above-mentioned features which facilitates reduction of the disturbing radiation on the sample with unchanged useful X-radiation source power and with a minimum of technically straightforward modifications.

SUMMARY OF THE INVENTION

This object is achieved in accordance with the invention in a surprisingly simple and effective manner in that a first collimator is disposed in a focus of the first graded multi-layer mirror between the X-ray source and mirror whose opening in the x-direction corresponds to the region of acceptance of the first graded multi-layer mirror, wherein the separation $q_{zA}$ between first collimator and X-ray source is:

$$Q_{zA}=Q_x/\tan\alpha_x$$

with $\alpha_x$ characterizing the angle spanned by the first graded multi-layer mirror in the x direction, as viewed from the first collimator.

That portion of X-radiation emitted from the X-ray source towards and onto the X-ray mirror which would, in any event, not meet the Bragg condition contains a high portion of unwanted disturbing radiation and is therefore collimated out of the downstream optical path.

The inventive solution is also advantageous in that the extension of the X-ray source in the z direction is effectively eliminated since the X-ray mirror images the collimator only, which has practically no depth in the z direction. The focal depth of the image is substantially limited only by the thickness of the collimator.

Graded mirrors are used having a layer separation which vanes laterally and/or in depth. This facilitates a particularly high Intensity of reflected radiation. The mirrors can be cylindrical, spherical, elliptical, parabolic, hyperbolic, or flat.

It should be noted that the invention is advantageous not only in the field of X-ray optics but also in the field of neutron optics and can also be used as a source for synchrotron radiation. Towards this end, "neutron" optical elements can be used as mirrors.

One particularly preferred embodiment of the inventive X-ray optical system is characterized in that a second graded multi-layer mirror is provided, wherein the extension $Q_y$ of the X-ray source in a y direction perpendicular to a connecting line in the z direction between the X-ray source and the second graded multi-layer mirror, is larger than the region of acceptance of the mirror at a focus of the mirror in the y direction, and a second collimator is disposed in a focus of the second graded multi-layer mirror between the X-ray source and mirror, whose opening in the y direction corresponds to the region of acceptance of the second graded multi-layer mirror, wherein the separation $q_{zB}$ between the second collimator and the X-ray source is:

$$Q_{zB}=Q_y/\tan\alpha_y$$

with $\alpha_y$ defining the angle subtended by the second graded multi-layer mirror in the y direction, as viewed from the second collimator. This permits focusing in two dimensions.

In a particularly preferred further development of this embodiment, the x direction and y direction are orthogonal. In such an orthogonal x and y system, the radiation directions are linearly independent and the effects of the two graded multi-layer mirrors are decoupled. This permits particularly simple realization and also easy adjustability of the inventive system. In another further development of the above-mentioned embodiment, the focus of the first graded multi-layer mirror coincides with the focus of the second graded multi-layer mirror. In this arrangement, one single collimator is sufficient since the two collimators spatially coincide.

Alternatively, in other further developments, the focus of the first graded multi-layer mirror may not coincide with the focus of the second graded multi-layer mirror. The two graded multi-layer mirrors can be optimized completely independent of each other, in particular when the two mirrors have different separations from the X-ray source.

In a particularly preferred embodiment, the collimators can be adjusted for optimum, fine tuning of the arrangement. In particular, the collimators can be cross collimators, slit collimators, apertured collimators or iris collimators.

In a particularly preferred embodiment of the inventive arrangement, the extension $Q_x$ of the X-ray source in the x direction is between 2 and 50 times, preferably between 5 and 20 times, in particular 10 times larger than the region of acceptance of the first graded multi-layer mirror in the x direction and optionally, the extension $Q_y$ of the X-ray source in the y direction is between 2 and 50 times, preferably between 5 and 20 times, in particular 10 times larger than the region of acceptance of the second graded multi-layer mirror in the y direction. The undesired disturbing radiation can thereby be suppressed particularly well when conventional X-ray sources are used together with common X-ray mirrors.

In a further advantageous embodiment of the inventive device, the region of acceptance of the first graded multi-layer mirror in the x direction and optionally the region of acceptance of the second graded multi-layer mirror in the y direction are each between 10 and 100 μm. Particularly effective Göbel mirrors can be produced in this region.

In embodiments of the invention, the first and optionally second graded multi-layer mirror can be curved in the form of a parabola or ellipse.

Alternatively or supplementary, the first and optionally second graded multi-layer mirror can be flat.

An X-ray spectrometer or X-ray diffractometer or an X-ray microscope is also within the scope of the present invention, each in conjunction with an X-ray optical system of the above-described inventive type.

Further advantages of the invention can be extracted from the description and the drawing. The features mentioned above and below can be used in accordance with the invention either individually or collectively in any arbitrary combination. The embodiments shown and described are not to be understood as exhaustive enumeration, rather have exemplary character for describing the invention.

The invention is shown in the drawing and is explained in more detail with reference to embodiments.

BRIEF DESCRIPTION OF THE DRAWING

FIGS. 3*a/b* show a schematic illustration of the optical path geometries of the X-ray optics of FIG. 1 in two planes;

DESCRIPTION OF THE PREFERRED EMBODIMENT

Figure 1:
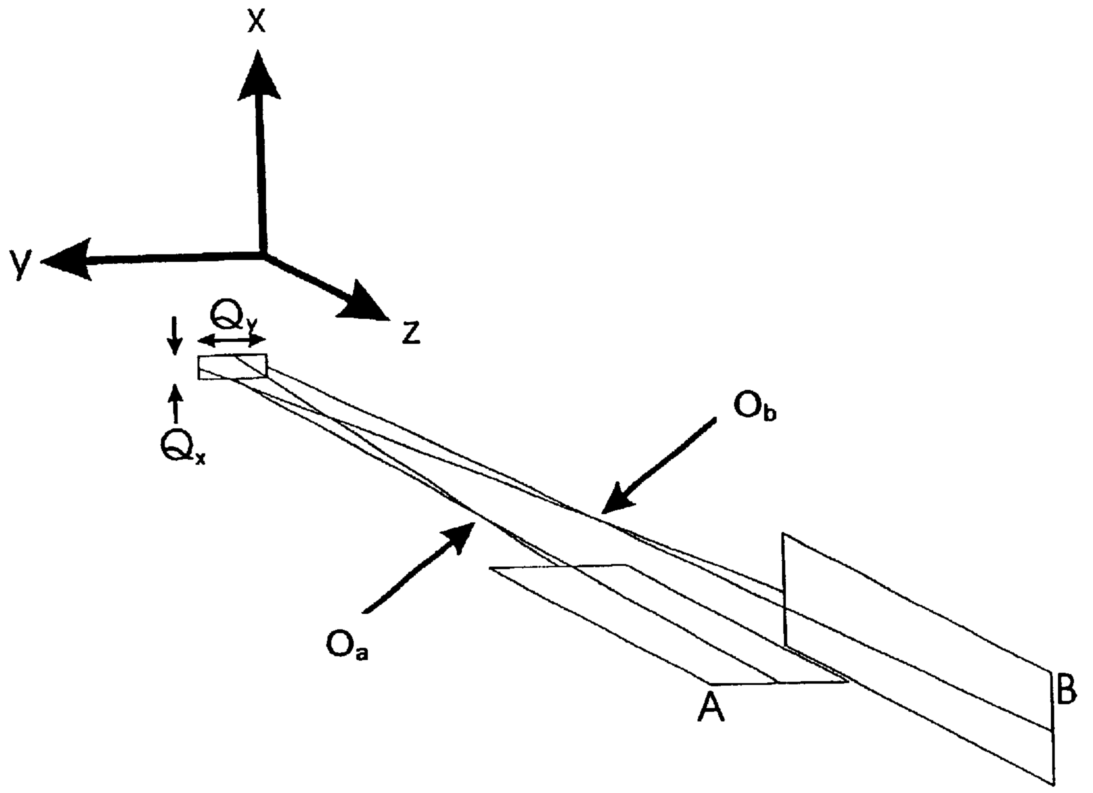
FIG. 1 shows the schematic spatial arrangement of an X-ray optics with two X-ray mirrors in front of an X-ray source.

FIG. 1 shows the schematic spatial arrangement of the X-ray optics. An X-ray mirror A is disposed in the y-z plane as defined by an orthogonal x-y-z coordinate system. In the image of a source $Q_x$ extended in the x direction, the edge rays of the mirror A intersect at the focus $O_a$. A further X-ray mirror B is disposed in the x-z plane. For imaging a source $Q_y$ which is extended in the y direction, the edge rays of the mirror B intersect at the focus $O_b$. In accordance with the invention, collimators are positioned at locations $O_a$ and $O_b$.

Figure 2:
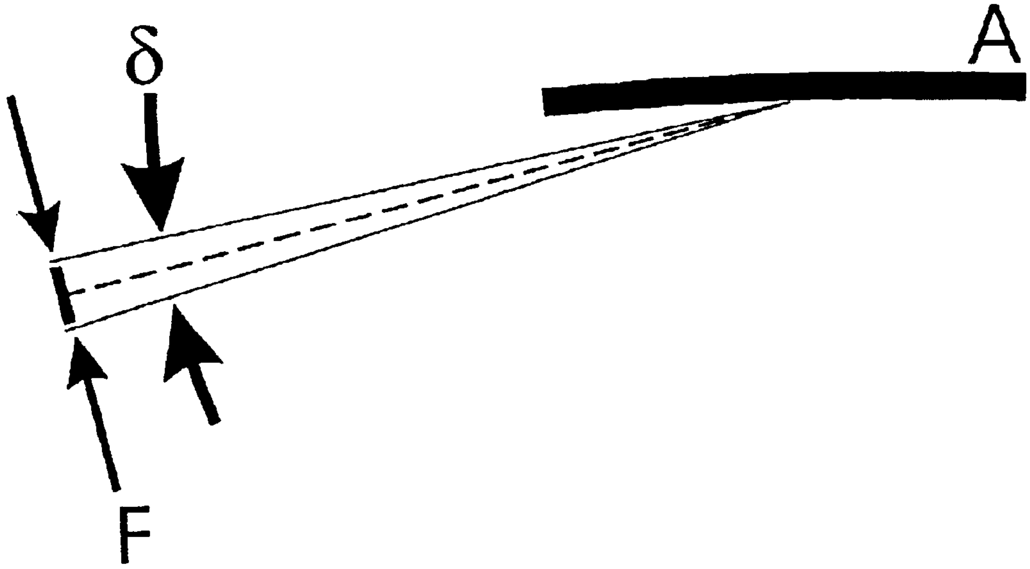
FIG. 2 shows a schematic illustration of the characteristic dimensions of an X-ray mirror.

FIG. 2 schematically shows the characteristic sizes of an X-ray mirror A. Radiation is reflected only from the region of the acceptance angle δ of the X-ray mirror A. The region of acceptance F is imaged in the focus $O_a$ of the X-ray mirror A.

FIG. 3*a* schematically shows the optical path geometry of the X-ray optics of FIG. 1 in the x-z plane. The source $Q_x$ is imaged via a collimator with opening width $F_x$ at the focus $O_a$ of the X-ray mirror A. The effective diverging angle region $\alpha_x$ of the X-ray mirror A thereby results from the projection of the source dimensions $S_x$ and the separation between the focus $O_a$ and the X-ray mirror A. The separation $q_{zA}$ of the source $Q_x$ and the position of the collimator is thereby $q_{zA}=Q_x/\tan\alpha_x$.

FIG. 3*b* schematically shows the optical path geometry of the X-ray optics of FIG. 1 in the y-z plane. The source $Q_y$ is imaged via a collimator with opening width $F_y$ at the focus $O_b$ of the X-ray mirror B. The effective diverging angle region $\alpha_y$ of the X-ray mirror B thereby results from the projection of the source dimensions $S_y$ and the separation between focus $O_b$ and X-ray mirror B. The separation $q_{zB}$ of the source $Q_y$ and the position of the collimator is thereby $q_{zB}=Q_y/\tan\alpha_y$.

Figure 4A:
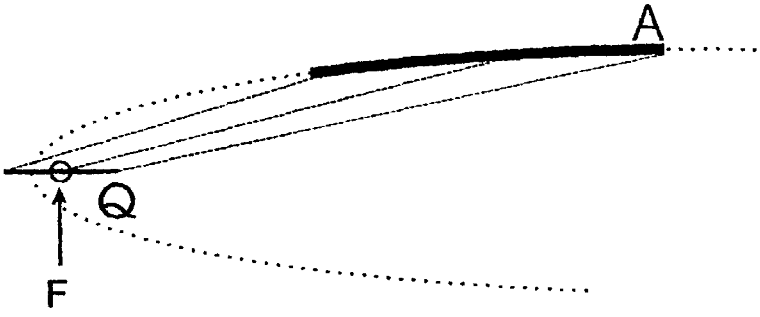
FIG. 4*a* shows a schematic illustration of the optical path geometry of a line focus source in the focus of an X-ray mirror.

FIG. 4*a* schematically shows the optical path geometry of a line focus source Q at the focus $O_a$ of an X-ray mirror A whose curvature is indicated with dashed lines. Since the dimensions of the source Q are larger than the effective focal size (region of acceptance) F of the X-ray mirror A, imaging errors occur due to the non-vanishing depth of focus.

Figure 4B:
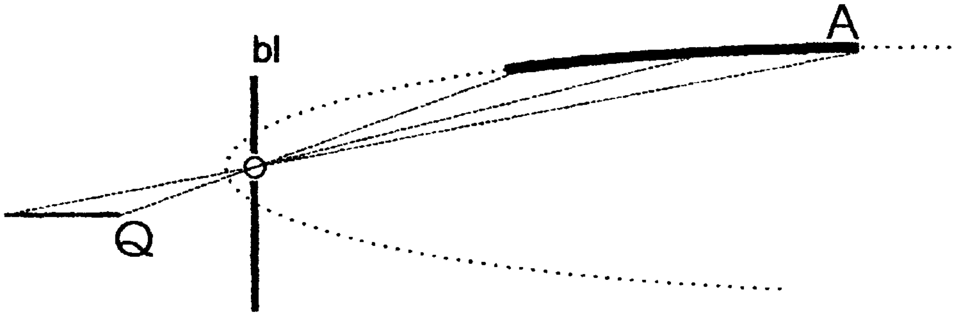
FIG. 4*b* shows a schematic illustration of the optical path geometry of a line focus source imaged by a collimator.

Use of a collimator bl at the location of focus $O_a$ of the X-ray mirror A, schematically shown in FIG. 4*b*, reduces these imaging errors. The (effectively vanishing) depth of the collimator bl in the z direction is responsible for the imaging error and not the dimension of the line focus source Q in the z direction. The collimator width $F_x$ must thereby be adjusted to the effective focus size F.

Figure 5A:
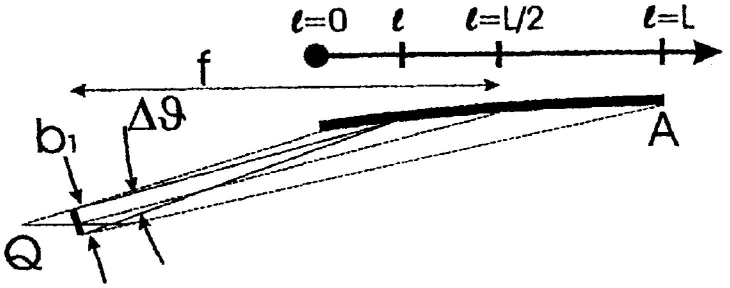
FIG. 5*a* shows a schematic illustration of the optical path geometry of a projected line focus source in the focus of an X-ray mirror taking into consideration the position along the X-ray mirror in accordance with prior art.

FIG. 5*a* shows a schematic illustration of the optical path geometry of a projected line focus source $b_1$ in the focus $O_a$ of X-ray mirror A of length L The angular region $\Delta\vartheta$ subtended by the projected line focus source $b_1$ depends on the location I on the X-ray mirror A, with I=0 at the left edge of the mirror A, I=L/2 In the center of the mirror and I=L at the right edge of the mirror A. The separation between the center of the source Q and the center of the mirror A along the z axis is thereby f.

Figure 5B:
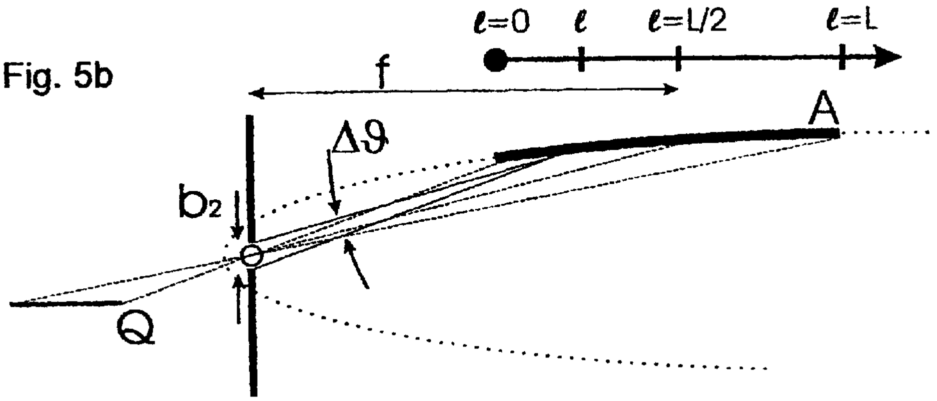
FIG. 5*b* shows a schematic illustration of the optical path geometry of a line focus source shown with a collimator in accordance with the invention taking into consideration the position along the X-ray mirror.

FIG. 5*b* shows a schematic illustration of the inventive optical path geometry of the line focus source Q shown with a collimator bl of opening width $F_x$. The opening width $f_x$ corresponds here to the projected line focus source which is also referred to below with $b_2$. The center of the collimator bl is thereby at the focus $O_a$ of the approximately flat X-ray mirror A of the length L. The angle region $\Delta\vartheta$ subtended by the collimator opening $b_2$ depends on the location I on the X-ray mirror A. The local coordinate I along the mirror A is defined as in FIG. 5*a*. The separation between the collimator bl and the center of the mirror A along the z axis is f.

The optical path geometries shown in FIGS. 5*a* and 5*b* serve as basis for the following calculation of the bandwidths $\Delta\lambda$ (the widths of the wavelength regions which are reflected or imaged) of the radiation imaged by the X-ray mirror A.

According to the Bragg equation:

$$\lambda=2d\sin\vartheta$$

with $\lambda$: wavelength of the reflected radiation; d: planar separation in the reflecting crystal; and $\vartheta$: angle between the surface of the reflecting crystal and the direction of impinging or emerging radiation.

Differentiation of the Bragg equation produces:

$$\Delta\lambda=(d\lambda/d\vartheta)\Delta\vartheta=2d\cos\vartheta\Delta\vartheta$$

with $\Delta\lambda$: bandwidth of the reflected radiation; and $\Delta\vartheta$: angle region at which radiation from the X-ray source impinges on the reflecting crystal.

For the present graded multi-layer mirror A as reflecting crystal, d depends on the location on the mirror A according to $$d=d(l)=d_m-gL/2+gl$$

with $d_m$: d value of the multi-layer in the mirror center; and g: d grading along the mirror A. The values $\vartheta$ and $\Delta\vartheta$ each depend on I and can be determined as follows from geometrical considerations:

$$\vartheta=\vartheta(l)=\arcsin(\lambda_{K\alpha}/(2d(l)))\text{ and}$$

$$\Delta\vartheta=\Delta\vartheta(l)=\arctan(b/(f-L/2+l))$$

with b: projected size of the X-ray source. In the optical path geometry of FIG. 5*a*, the size of the projected X-ray source b corresponds to the effective focus size F of the mirror A which is defined herein as $b_1$. In the inventive optical path geometry of FIG. 5*b, b* corresponds to the collimator width $F_x$ or $b_2$.

The transformations lead to:

$$\Delta\lambda(l)=(d_m-gl/2+gl)(4-(\lambda_{K\alpha}/(d_m-gL/2+gl))^2)^{1/2}\arctan(b/(f-L/2+l))\approx(d_m-gL/2+gl)(4-(\lambda_{K\alpha}/(d_m-gL/2+gl))^2)^{1/2}(b/(f-L/2+l))\propto b$$

The bandwidth $\Delta\lambda$ depends linearly on the projected size of the X-ray source b which can be considerably reduced through inventive introduction of a collimator bl.

This is shown in the concrete calculation of $\Delta\lambda$ using the following numbers which could be valid for typical X-ray optics:

$\lambda_{K\alpha}=1.5418\cdot10^{-10}$ m(Cu—Kα radiation)
$d_m=37\cdot10^{-10}$ m
$g=2\cdot10^{-8}$
$L=60\cdot10^{-3}$ m
$F=100\cdot10^{-3}$ m
and $b_1=0.8\cdot10^{-3}$ m (see FIG. 5*a*)
or $b_2=0.04\cdot10^{-3}$ m (see FIG. 5*b*)

Figure 6:
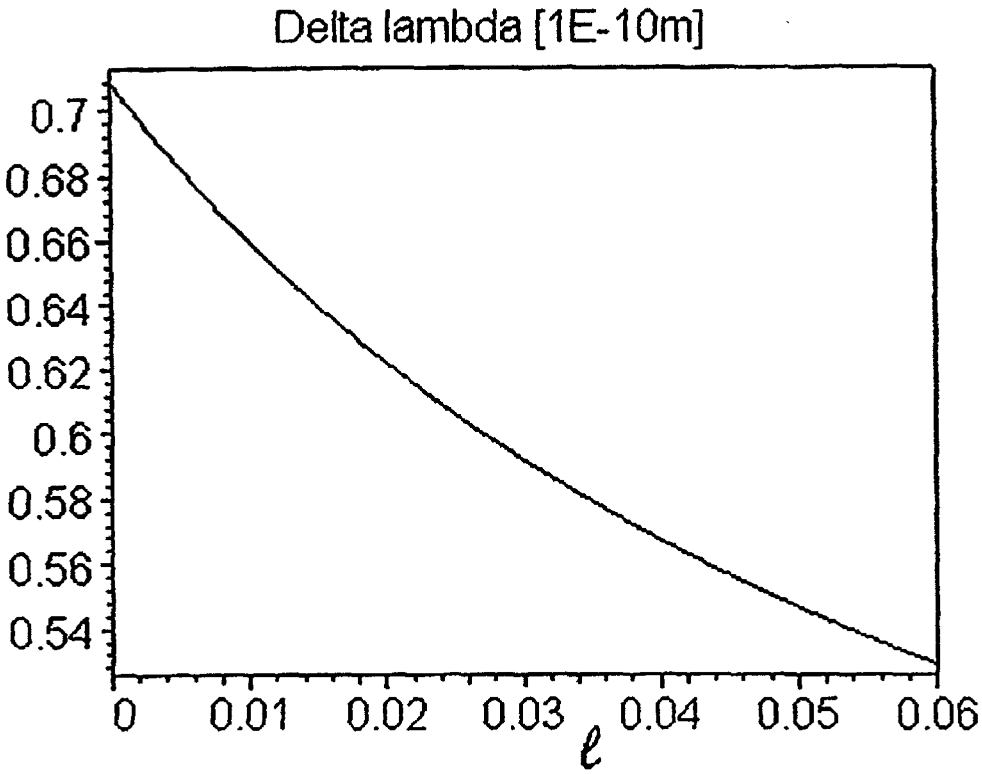
FIG. 6 shows a diagram of the calculated bandwidth of an X-ray mirror with a projected size of the X-ray source corresponding to the focus size of the X-ray mirror.
Figure 7:
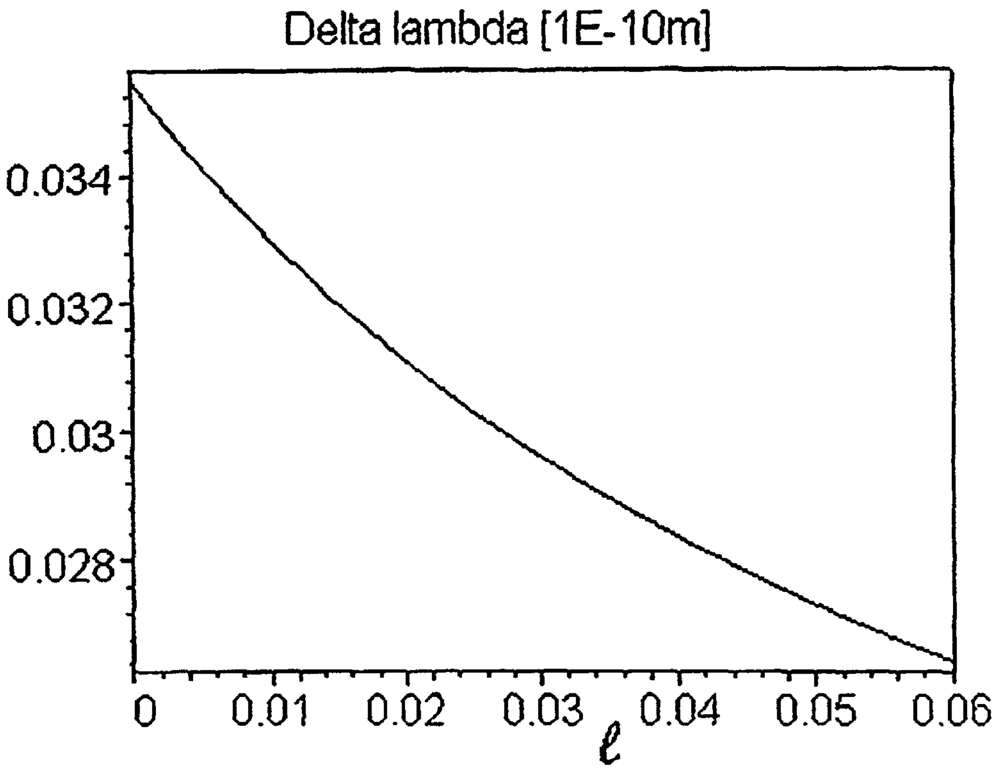
FIG. 7 shows a diagram of the calculated bandwidth of an X-ray mirror with a projected size of the X-ray source corresponding to the collimator diameter.

The results of the calculations are shown in FIGS. 6 and 7.

FIG. 6 shows a diagram of the calculated bandwidth $\Delta\lambda$ (in A) of an X-ray mirror A in dependence on the local coordinate I (in m) along the X-ray mirror A with a projected size of the X-ray source $b_1$ corresponding to the effective focus value F of the X-ray mirror A (see FIG. 5*a*). The bandwidth $\Delta\lambda$ is above 0.5 A for all values of I; for I=0 it is approximately 0.71 A.

FIG. 7 shows a diagram of the calculated bandwidth (in A) of an X-ray mirror A in dependence on the local coordinate I (in m) along the X-ray mirror A with a projected size of the X-ray source $b_2$ corresponding to the collimator width $F_x$ (see FIG. 5*b*). The bandwidth $\Delta\lambda$ is below 0.036 A for all values of I. For I=0, it is approximately 0.035 A.

Figure 8:
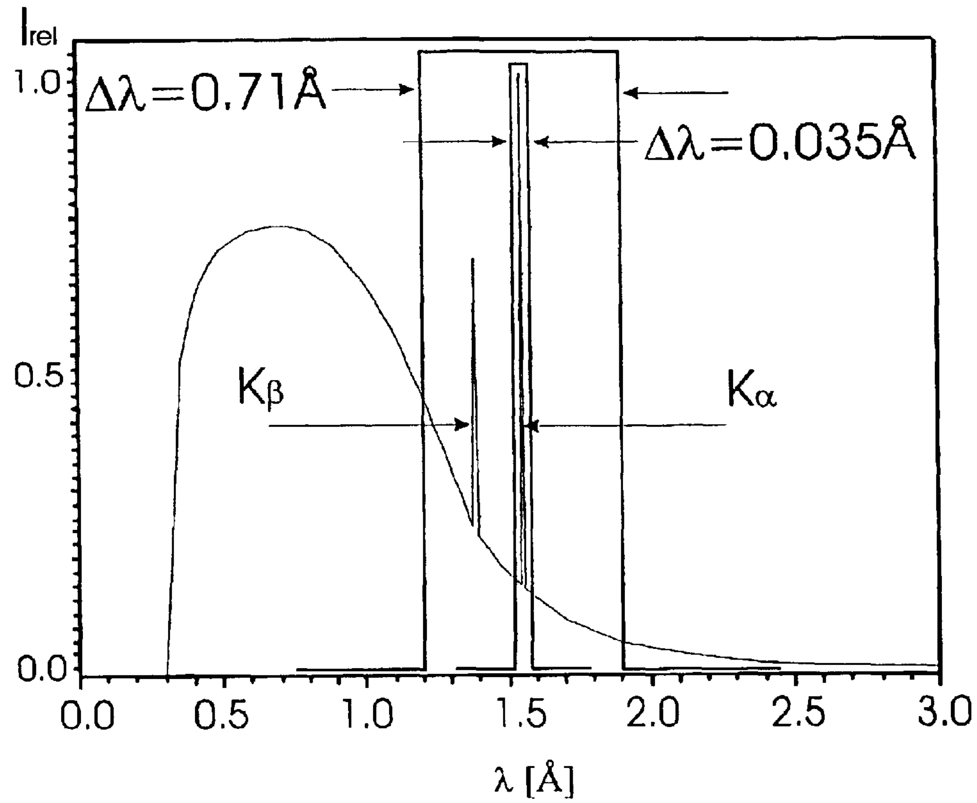
FIG. 8 shows the spectrum of a Cu tube considering the bandwidths of different X-ray optical arrangements.

The inventive X-ray optics permits selection of the $K_\alpha$ lines from the emission spectrum of a Cu tube as X-ray source Q, shown in FIG. 8. The diagram shows the relative intensity of the X-radiation emitted by the source Q as function of the wavelength $\lambda$. The major part of the radiation is bremsstrahlung radiation with a continuous wavelength distribution and a maximum at approximately 0.7 A. The characteristic emission lines of copper are superposed thereon of which the average values of the $K_\alpha$ and $K_\beta$ lines are shown in the diagram. The $K_\alpha$ lines generally represent the useful radiation of the X-ray arrangement. The bandwidth $\Delta\lambda$ of the X-ray optics of the known prior art according to FIG. 5*a* at I=0 is approximately $\Delta\lambda$=0.71 A and covers the $K_\alpha$-lines and $K_\beta$ lines as well as a considerable amount of bremsstrahlung radiation. The inventive X-ray optics in accordance with FIG. 5*b,* however, has a bandwidth $\Delta\lambda$ at I=0 of approximately 0.035 A which is sufficient for exclusive selection of the $K_\alpha$ lines with only a small bremsstrahlung radiation portion.

We claim:

1. An X-ray optical system for X-ray analysis of a sample, the system comprising:

a first graded multi-layer mirror;

an X-ray source for generating X-rays ampingent on said first graded multi-layer mirror, said X-ray source having an extension $Q_x$ in an X-direction, perpendicular to a connecting line in a z-direction between said X-ray source and said first graded multi-layer mirror, which is larger than a region of acceptance of said first graded multi-layer mirror in a first focus of said first mirror in said x-direction; and a first collimator disposed at said first focus between said X-ray source and said first mirror, said first collimator having a first opening in said x-direction corresponding to a region of acceptance of said first mirror, wherein a separation $q_{zA}$ between said first collimator and said X-ray source is given by $q_{zA}=Q_x/\tan\alpha_x$, with $\alpha_x$ being an angle subtended by said first graded multi-layer mirror in said x-direction as seen from said first collimator.

2. The system of claim 1, further comprising a second graded multi-layer mirror, wherein an extension $Q_y$ of said X-ray source in a y direction, perpendicular to a connecting line in said z direction between said X-ray source and said second graded multi-layer mirror, is larger than a region of acceptance of said second mirror in a second focus of said second mirror in said y direction, and further comprising a second collimator disposed at said second focus of said second graded multi-layer mirror between said X-ray source and said second mirror, said second collimator having an opening in said y direction corresponding to a region of acceptance of said second graded multi-layer mirror, a separation $q_{zB}$ between said second collimator and said X-ray source being $q_{zB}=Q_y/\tan\alpha_y$ wherein $\alpha_y$ defines an angle subtended by said second graded multi-layer mirror in said y direction, as viewed from said second collimator.

3. The system of claim 2, wherein said x direction and said y direction are orthogonal.

4. The system of claim 2, wherein said first focus of said first graded multi-layer mirror does not coincide with said second focus of said second graded multi-layer mirror.

5. The system of claim 2, wherein said extension $Q_y$ of said X-ray source (Q) in said y direction is between 2 and 50 times larger than said region of acceptance of said second graded multi-layer mirror in said y direction.

6. The system of claim 2, wherein said extension $Q_y$ of said X-ray source (Q) in said y direction is between 5 and 20 times larger than said region of acceptance of said second graded multi-layer mirror in said y direction.

7. The system of claim 2, wherein said extension $Q_y$ of said X-ray source (Q) in said y direction is 10 times larger than said region of acceptance of said second graded multi-layer mirror in said y direction.

8. The system of claim 2, wherein said region of acceptance of said second graded multi-layer mirror in said y direction is between 10 and 100 $\mu$m.

9. The system of claim 2, wherein said second graded multi-layer mirror (A,B) is curved in one of a parabolic and elliptic shape.

10. The system of claim 2, wherein said second graded multi-layer mirror is flat.

11. The system of claim 1, wherein said first collimator can be adjusted.

12. The system of claim 1, wherein said extension $Q_x$ of said X-ray source in said x direction is between 2 and 50 times larger than said region of acceptance of said first graded multi-layer mirror in said x direction.

13. The system of claim 1, wherein said extension $Q_x$ of said X-ray source in said x direction is between 5 and 20 times larger than said region of acceptance of said first graded multi-layer mirror in said x direction.

14. The system of claim 1, wherein said extension $Q_y$ of said X-ray source in said x direction is 10 times larger than said region of acceptance of said first graded multi-layer mirror in said x direction.

15. The system of claim 1, wherein said region of acceptance of said first graded multi-layer mirror in said x direction is between 10 and 100 $\mu$m.

16. The system of claim 1, wherein said first graded multi-layer mirror (A,B) is curved in one of a parabolic and elliptic shape.

17. The system of claim 1, wherein said first graded multi-layer mirror is flat.

18. An X-ray spectrometer with the X-ray optical system of claim 1.

19. An X-ray diffractometer with the X-ray optical system of claim 1.

20. An X-ray microscope with the X-ray optical system of claim 1.

21. The system of claim 1, further comprising a second graded multi-layer mirror, wherein an extension $Q_y$ of said X-ray source in a y direction, perpendicular to a connecting line in said z direction between said X-ray source and said second graded multi-layer mirror, is larger than a region of acceptance of said second mirror in a second focus of said second mirror in said y direction, wherein said second focus coincides with said first focus, wherein said first collimator has an opening in said y direction corresponding to a region of acceptance of said second graded multi-layer mirror, a separation $q_{zB}$ between said first collimator and said X-ray source being $q_{zB}=Q_y/\tan\alpha_y$, wherein $\alpha_y$ defines an angle subtended by said second graded multi-layer mirror in said y direction, as viewed from said first collimator.

* * * * *